United States Patent [19]
Allain et al.

[11] Patent Number: 5,954,200
[45] Date of Patent: Sep. 21, 1999

[54] MOTOR VEHICLE PROTECTION APPARATUS AND METHOD

[76] Inventors: Mark Allain; Joseph Allain, Jr., both of 4932 Chantilly Dr., New Orleans, La. 70126

[21] Appl. No.: 09/014,995

[22] Filed: Jan. 28, 1998

Related U.S. Application Data

[63] Continuation-in-part of application No. 08/660,663, Jun. 5, 1996.

[51] Int. Cl.$^6$ .................................................. B65D 85/68
[52] U.S. Cl. ............................................................ 206/335
[58] Field of Search ..................... 206/335, 522, 206/597, 806; 53/459, 464; 150/154, 158, 166–168, 901; 383/72, 100, 113; 296/130, 136; 24/67.3, 67.5, 67.7, 67.9

[56] References Cited

U.S. PATENT DOCUMENTS

| | | | |
|---|---|---|---|
| 2,646,097 | 7/1953 | Gaverth et al. | 150/166 |
| 3,044,516 | 7/1962 | Stoll | 150/166 |
| 3,474,803 | 10/1969 | Davis | 135/124 |
| 3,820,651 | 6/1974 | Levy | 150/167 |
| 3,884,523 | 5/1975 | Allen | 206/335 |
| 4,315,535 | 2/1982 | Battle | 206/335 |
| 4,773,456 | 9/1988 | Rodgers | 206/335 |
| 4,930,557 | 6/1990 | Lohse | 206/335 |
| 4,979,339 | 12/1990 | Jones et al. | 150/166 |
| 5,176,421 | 1/1993 | Fasiska | 150/166 |
| 5,282,502 | 2/1994 | Ballard | 206/335 |
| 5,287,614 | 2/1994 | Ehrlich | 150/158 |
| 5,458,945 | 10/1995 | Tall | 150/166 |
| 5,533,616 | 7/1996 | Crowfoot | 206/335 |

*Primary Examiner*—Paul T. Sewell
*Assistant Examiner*—Luan K. Bui
*Attorney, Agent, or Firm*—Jim Zegeer

[57] ABSTRACT

A vehicle protective enclosure comprises a flexible plastic envelope having a side portion containing a sealable side opening. The sealable side opening is sized to permit total entry of a vehicle into the envelope. The invention includes a device for hermetically sealing the side opening to prevent the egress of air after a vehicle has been placed in the flexible plastic envelope. For protection in flood conditions, the envelope is anchored or tethered to stationary objects, and preferably two or more ends are anchored or tethered.

8 Claims, 3 Drawing Sheets

MOTOR VEHICLE PROTECTION APPARATUS AND METHOD

REFERENCE TO RELATED APPLICATION

This application is a continuation-in-part application of our copending application Ser. No. 08/660,663 filed Jun. 5, 1996, pending.

BACKGROUND AND BRIEF DESCRIPTION OF THE INVENTION

This invention relates to an apparatus and method for protecting automotive vehicles.

Motor vehicle protection devices are known in the prior art as shown in Battle U.S. Pat. No. 4,315,535. Battle shows a flood protection apparatus in which a unitary flexible plastic bag receives and encloses a motor vehicle and has a draw string for closing the top of the container over the top of the vehicle and gathering-in the open top. The Battle device avoids air entrapment because, according to Battle, it may result in floating of the entire apparatus. In Rogers U.S. Pat. No. 4,773,456, a flexible vehicle cover is provided which will collapse on the motor vehicle as flood waters rise. Rogers provides a vent with a flotation collar to prevent entrance of flood waters, mud and debris to the vent even when the vehicle is completely submerged by flood waters.

We have discovered that when the flood water levels are about 1–2 feet or greater above ground level, the average vehicle, such as a car or pickup truck, in a sealed flexible waterproof container as disclosed herein will float. If the flexible waterproof container is tethered or otherwise anchored to some fixed object such as a telephone pole, power pole, concrete slab, weights, etc., the car will be protected during flood conditions. Anchoring or otherwise tethering the container prevents the floating car from being damaged and damaging other objects due to the movement given to it by the flowing flood waters. Preferably, the anchoring or tethering of the container is done at two or more points to prevent rotation of the tethered container about one tether or anchor point with shift of flood waters. At the same time, tethering or anchoring the vehicle container and the vehicle prevents puncturing or other damage to the container.

In a still further embodiment, the bottom and top covers are comprised of two rectangular sheets of waterproof material which hermetically are sealed at three intersecting sides and one open end portion. The open end is held open by a frame or individuals to allow the vehicle to be driven or rolled into the space defined in part by the sealed and intersecting sides or edges. The unsealed open end portion is then rolled-up on a relatively rigid member and the rolled-up edges clamped by clamps to maintain the seal. Any other sealing technique or device can be used.

In each embodiment, the bottom panel may include means to reduce the likelihood of puncture such as being a thicker plastic membrane, or the bottom panel can include a layer of burlap, spun polyethylene or rip stock nylon.

In one embodiment, the container is supplied folded. In another embodiment, the container is on a flexible plastic roller. The sizes will vary according to the classification size for the vehicle: subcompact, compact, intermediate and full size. An optional flotation ballast may be secured to the engine end of the container to maintain the vehicle level as disclosed in our above-mentioned application Ser. No. 08/660,663.

DESCRIPTION OF THE DRAWINGS

The above and other objects, advantages and features of the invention will become more apparent when considered with the following specification and accompanying drawings in which.

DETAILED DESCRIPTION OF THE INVENTION

Figure 1:
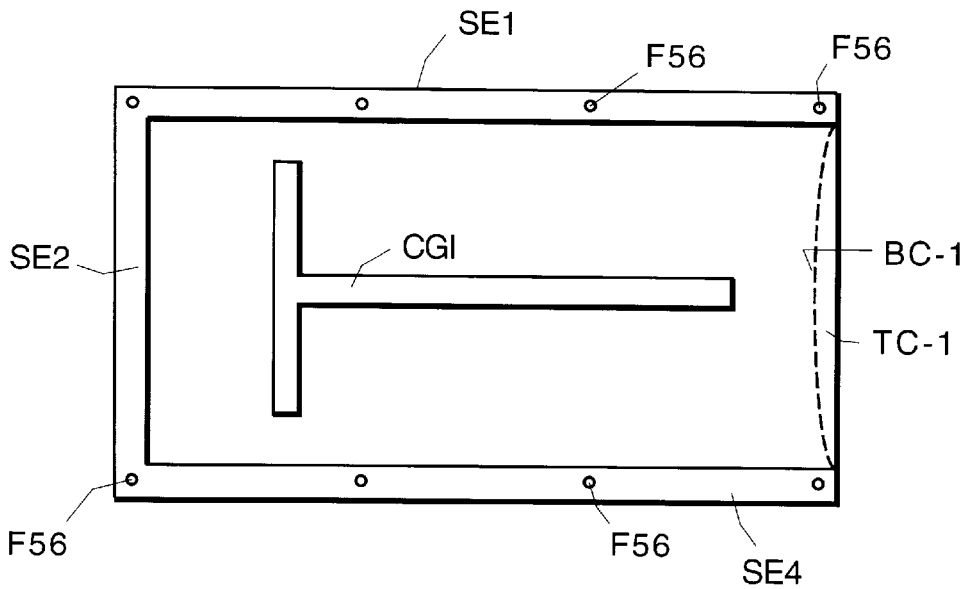
FIG. 1 is a top plan view of one preferred embodiment of the invention showing the open end of the vehicle envelope or bag for vehicle entrance.
Figure 2:
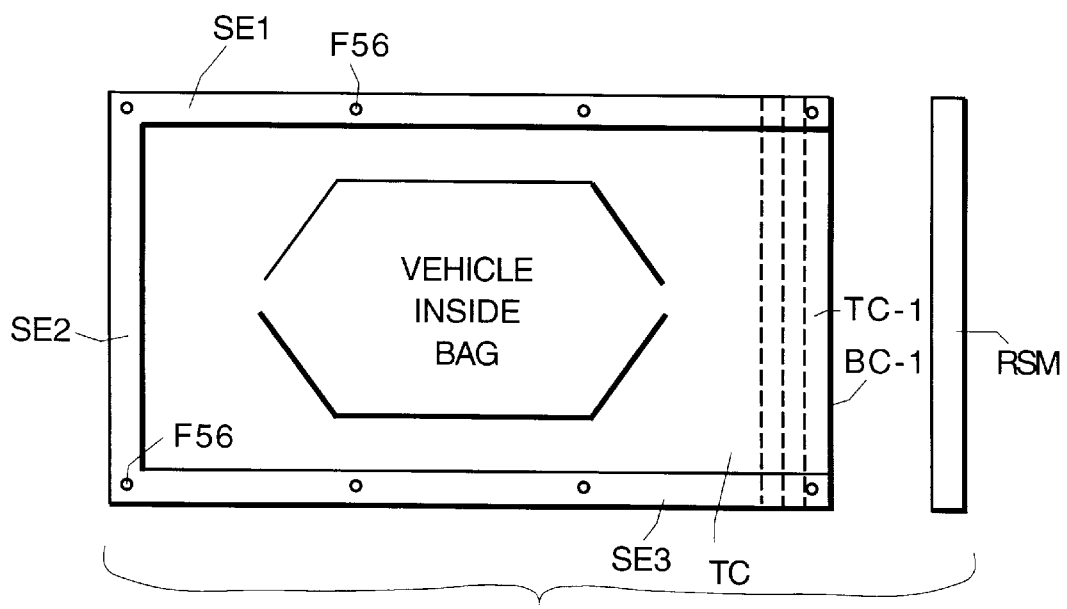
FIG. 2 is a top plan view of the embodiment of FIG. 1 with a vehicle enclosed.
Figure 3:
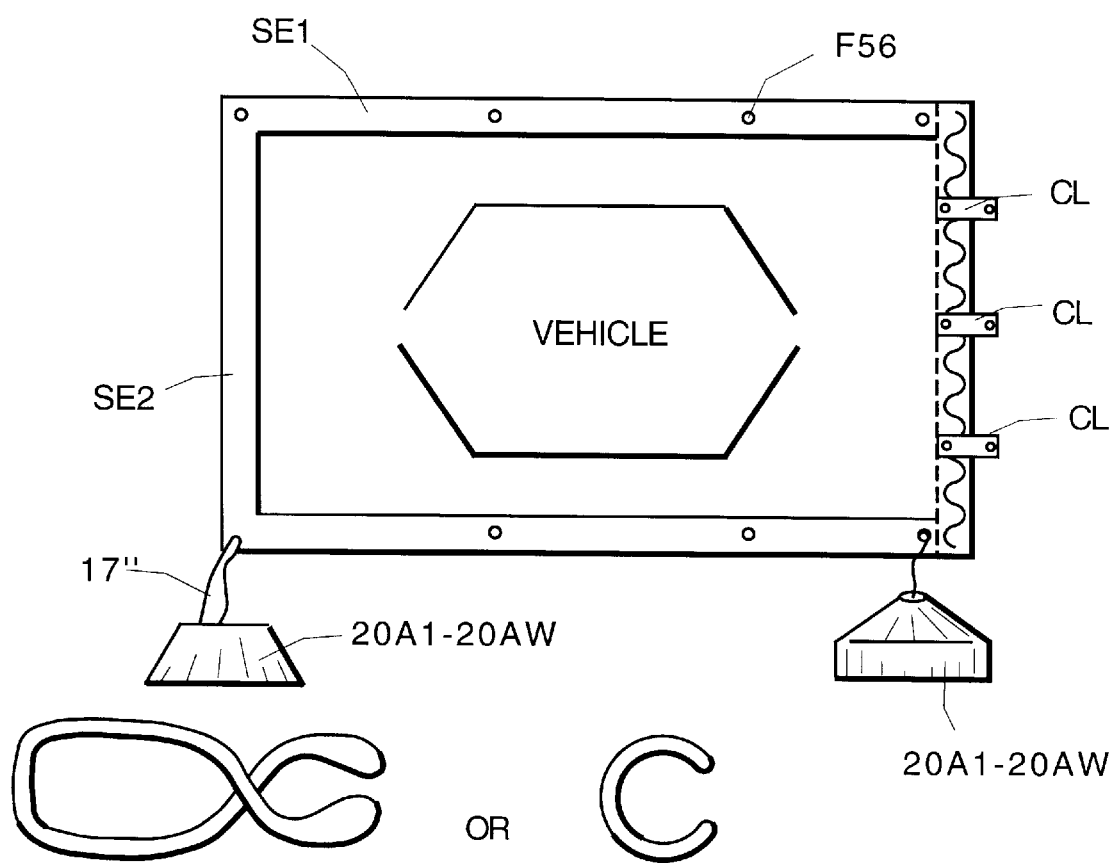
FIG. 3 is a top plan view of the embodiment of FIG. 1 after the open end has been rolled on the rigid member and seal clamp(s) applied.
Figure 4:
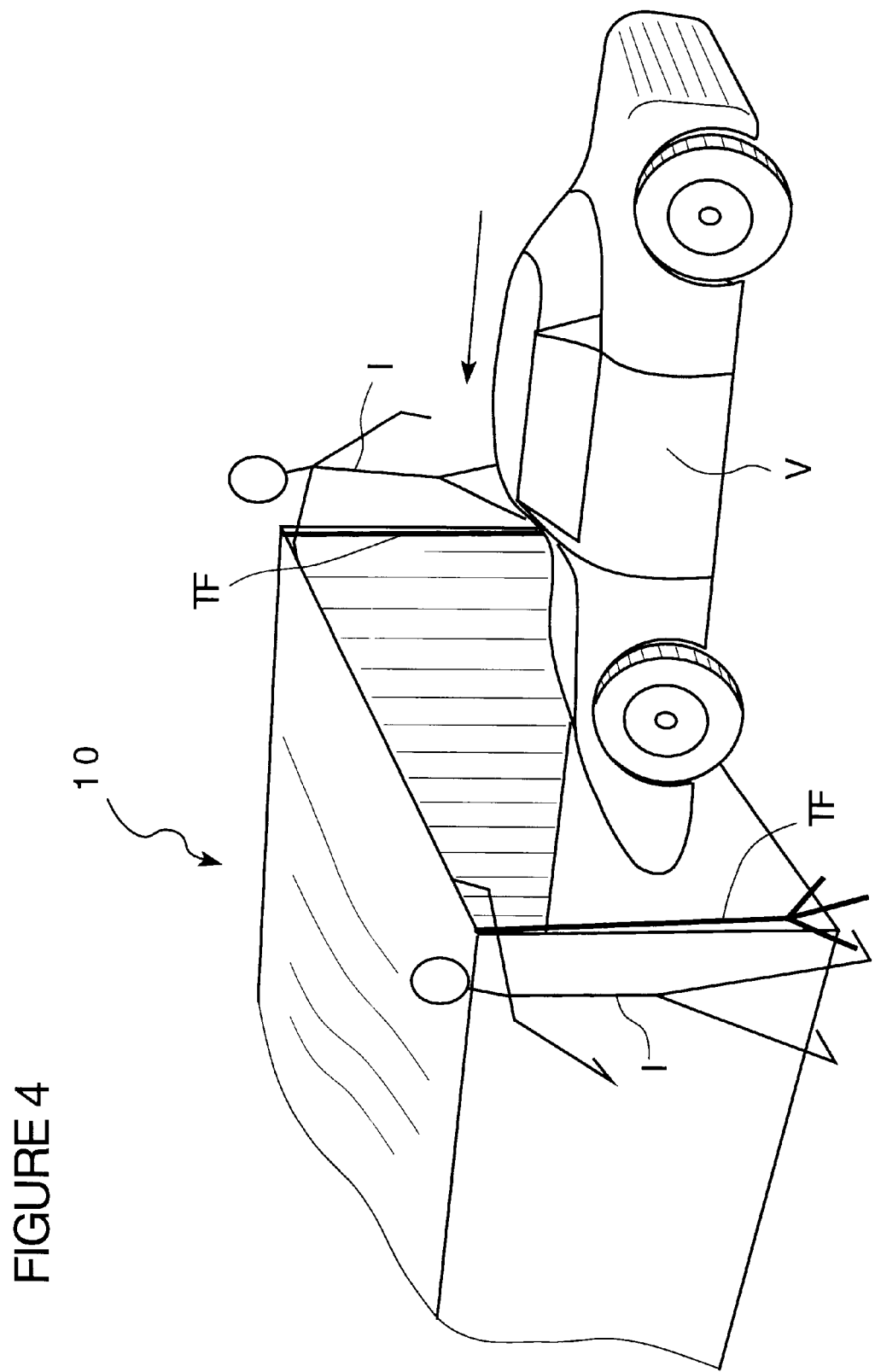
FIG. 4 is a schematic illustration showing driving or rolling of a vehicle into or out of the container.

In a preferred embodiment shown in FIGS. 1–3, the vehicle container 10 is comprised of a rectangular top cover sheet TC-1 hermetically joined or sealed on three congruent side edges SE1, SE2, SE3 to a rectangular bottom cover sheet BC-1. In this embodiment the hermetically sealed edges SE1, SE2, SE3 are made wide enough to allow tether and flotation securement grommets F56 to be provided in the side edges at about 3-feet spacing. A colored guide indicia CGI is imprinted or adhered to the top cover sheet TC-1. The material of the top cover sheet TC-1 is transparent or semi-transparent or semi-opaque so that the indicia is easily seen by the vehicle driver. As shown in FIG. 4, tripod frames TF or individuals I hold each side of the open-side open while the vehicle is driven or rolled into the opening. The vehicle is positioned with the stem of the "T" centered with the vehicle, and the driver advances the vehicle until the cross of the "T" intersects the stem at the beginning of the top front of the hood. The driver exits from the vehicle container or envelope 10 (room or space has been allocated to allow for this maneuver) and the envelope sealed by rolling the open edge over a rigid strip member RSM (FIG. 2) and retaining this fold or roll by means of clamp(s) CL (FIG. 3). A single plastic tubular clamp where the "spring" is in the material may be used.

When the flood water levels are about 1 foot or greater, the average vehicle, such as a car or pickup truck, in the flexible waterproof container 10 of this invention will float when the water is at about that height or greater above ground level. The container 10 is tethered or otherwise anchored to some fixed object such as a telephone pole, power pole, concrete slab, weights 20A1–20AW (FIG. 3), etc. Anchoring or otherwise tethering the container prevents the floating car from being damaged and damaging other objects due to the movement given to it by the flowing flood waters. In the preferred embodiment, at least two tether or anchor lines 17 are used to anchor both ends of the container to a stationary object. This avoids swinging of the tethered or anchored container with changes in directions of flow of flood waters. At the same time, tethering or anchoring the vehicle container and the vehicle prevents puncturing or other damage to the container.

Although two tether or anchor points F56 are shown and preferred, more or less tether or anchor points can be used. The bottom panel BC1 is made of a heavier gauge material and/or can be lined with burlap to avoid punctures and to better withstand loading and water pressures when floating and better securement for the tether or anchor points.

When the flood waters surrounding the container 10 begin to exert pressure on the external surfaces of the cover, the flexibility of the material forces air to billow the container 10 as the material is pressed against the tires and sides of the vehicle by hydrostatic pressure. The rolling of the open side on rigid member RSM and clamping of the rolled material of the container provides a hermetic seal to minimize the leakage of air.

As shown in our application Ser. No. 08/660,663, the weight of the engine of the vehicle can cause the vehicle in its protective container to tilt (as much as about 46°). An air flotation container AFC (not shown) may optionally be secured by flexible straps (not shown) which attach the flotation ballast AFC to the bottom of the lower container portion. With the flotation container, the angle of tilt is in the range of about 2°–3°. The lengths of the straps can be adjusted by buckles as well as their points of securement to the lower cover portion to thereby adjust the level of flotation compensation for the vehicle engine weight unbalance factor. The flotation container contains about 30 cubic feet of air and preferably has a sealable but removable cover. While foam flotation can obviously be substituted, the container version is preferred since it can serve as a storage container for the cover, and its components are less bulky for a given level of buoyancy.

In each of the embodiments, the container or bag portion engaged by the vehicle tires or which can come in contact with the sharp parts of the vehicle, a burlap or other puncture-resistive material can be placed and secured at selected locations to avoid puncture. For example, hydrostatic pressure on the underside of the lower bag portion can push against the lower surfaces of the vehicle between the wheels. These portions are protected by the puncture proofing described above. To remove stress in the material due to hydrostatic pressure in the space between the wheels, folds of the cover material between the wheels allow the lower bag between the wheels to bear against the underside of the vehicle.

While various preferred embodiments of the invention have been described and illustrated, it will be appreciated that various adaptations, modifications and changes will occur to those skilled in the art. Improved cover materials reducing their weight, bulk and cost are contemplated.

What is claimed is:

1. A protective enclosure for a four-wheeled vehicle comprising:
    a flexible plastic envelope having a floor panel, a side portion containing a sealable side opening, said sealable side opening being sized to permit total entry of said four-wheeled vehicle into said flexible plastic envelope so that four wheels are on said floor panel, and
    a device for hermetically sealing said side opening to prevent the egress of air after total entry of vehicle has been placed in said flexible plastic envelope wherein said device for hermetically sealing said side opening includes a rigid bar member having a length spanning said sealable side opening and said side portion being adapted to be rolled-up on said rigid bar member, and clamping member for clamping the rolled-up side portion and prevent unrolling thereof.

2. A protective enclosure as defined in claim 1 including means on said envelope for attaching one or more anchoring lines thereto.

3. A protective enclosure as defined in claim 1, said envelope having ends and including a plurality of anchor points formed on the said ends.

4. A protection enclosure as defined in claim 1 including frame means for holding said side opening while said vehicle is rolled into said flexible plastic envelope.

5. A method of protecting a motor vehicle having four ground-engaging wheels comprising the steps of:
    (A) providing a waterproof plastic envelope having a length greater than the length of said motor vehicle, a floor panel and a side opening which is sized to permit total entry of said motor vehicle into said envelope,
    (B) rolling said motor vehicle through said side opening until the vehicle is totally enclosed within said envelope with said four ground-engaging wheels on said floor panel, and
    (C) hermetically sealing said side opening to impede the flow of air in and out of said waterproof plastic envelope
    (D) providing an elongated rigid member and at least one clamp,
    (E) rolling said envelope portion bounding said side opening upon said rigid member to form a hermetic seal, and
    (F) applying said at least one clamp to said rolled-up envelope portion and said rigid member to prevent unrolling of said rolled-up envelope potion from said rigid member.

6. The method defined in claim 5 wherein said step (B) of rolling said motor vehicle through said side opening includes driving said motor vehicle through said side opening.

7. The method defined in claim 5 including the step of:
    (G) anchoring the sealed envelope to a stationary object with said vehicle therein.

8. The method in claim 7 wherein said envelope has first and second ends and said step (G) includes anchoring both said ends.

* * * * *